March 3, 1936. C. W. BENKMAN ET AL 2,032,560
DIRECTION SIGNAL FOR VEHICLES
Filed Jan. 3, 1934
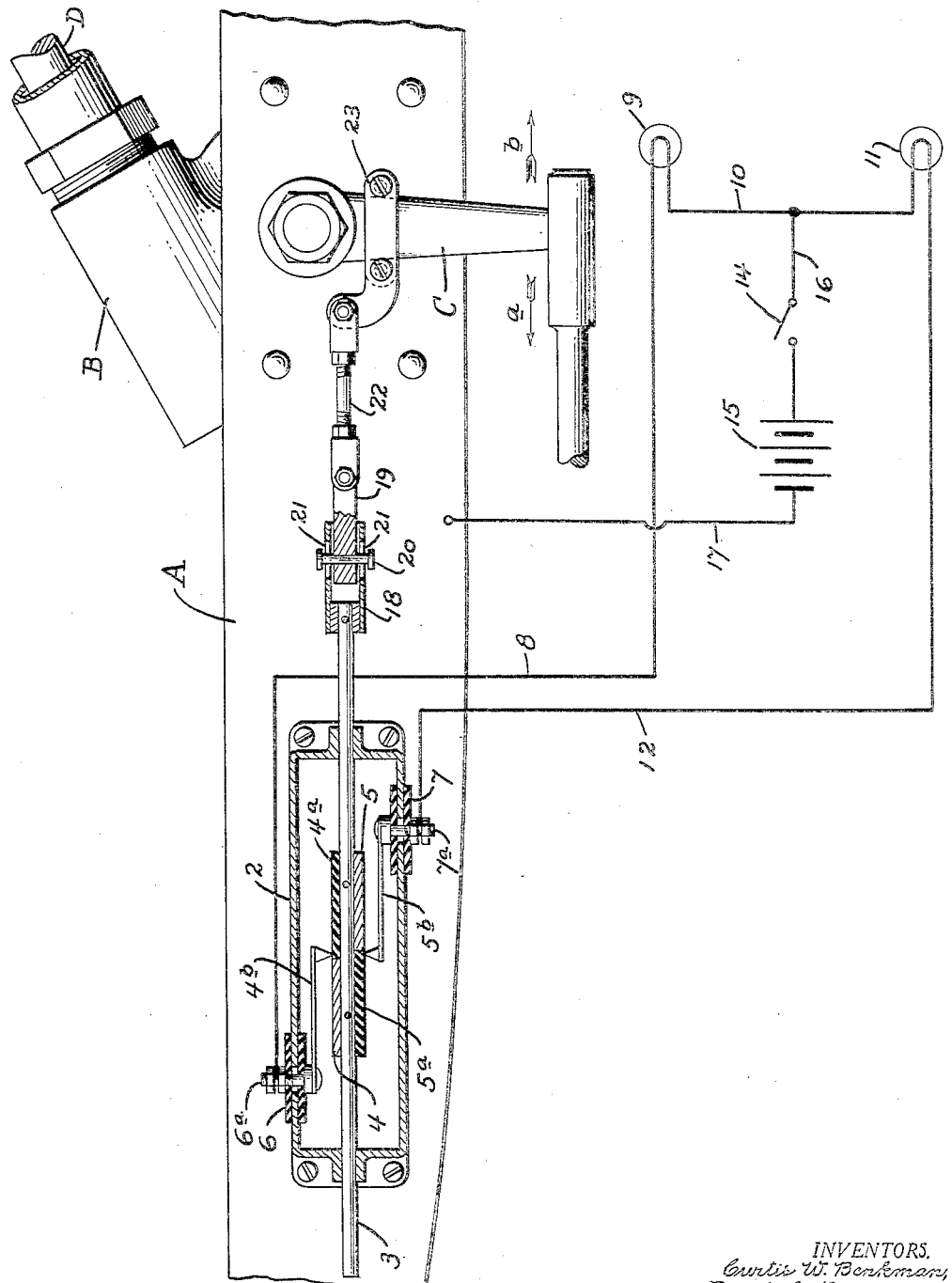
INVENTORS.
Curtis W. Benkman,
Frank C. Rodrigues,
BY Hugh F. Opperman.
Townsend and Loftus
ATTORNEYS.

Patented Mar. 3, 1936

2,032,560

UNITED STATES PATENT OFFICE 2,032,560

DIRECTION SIGNAL FOR VEHICLES

Curtis W. Benkman, Frank C. Rodrigues, and Hugh F. Opperman, Lanikai, Territory of Hawaii Application January 3, 1934, Serial No. 705,082

3 Claims. (Cl. 200—59)

This invention relates to direction signals for motor vehicles, and the like, and especially to a signaling mechanism which is actuated by the steering mechanism of the vehicle.

The object of the present invention is to generally improve and simplify the construction and operation of mechanisms for actuating direction signals for motor vehicles and the like; to provide a mechanism for operating a direction signal of the character described which is actuated from the steering mechanism of the vehicle; and further, to provide a mechanism of the character described whereby it is possible to display or illuminate a direction signal fifty (50) feet, or any prescribed distance, before making a turn and for maintaining the signal displayed or illuminated until the turn has been made.

The invention is shown by way of illustration in the accompanying drawing, which shows a longitudinal section of the mechanism. The view further shows the manner in which it is attached to the steering arm of the vehicle, and the drawing also shows in diagram the electric circuits controlled.

Referring to the drawing in detail, A indicates a portion of the main frame of a motor vehicle, or the like, B the housing containing the worm gears whereby the steering arm C is actuated, and D the shaft on which the usual steering wheel is secured.

Suitably secured to the main frame is a housing 2 and extending through the housing and slidable longitudinally thereof is a rod 3, on opposite sides of which are secured contact blocks 4 and 5 and also cooperating insulating blocks 4a and 5a. Also secured within the housing are a pair of flexible contacts 4b and 5b. These contacts are insulated with relation to the housing, as indicated at 6 and 7, and they are connected with terminal members 6a and 7a. The terminal 6a is connected through a wire 8 with one terminal of a signal lamp, indicated at 9, the other terminal of this signal lamp is connected with a wire 10 and this is connected with one terminal of a second signal lamp 11; the other terminal of said lamp being connected through a wire 12 with the terminal 7a.

A switch 14 controls the circuit through a wire 16. This switch may be mounted on the dashboard or at any point within convenient reach of the driver, and it is only employed when it is desired to render the signal lights inoperative. The signal light indicated at 9 is mounted on the right hand side of the vehicle, and preferably at the rear end, and the signal light indicated at 11 at the rear end on the left hand side. Current for operating the lights is derived from a battery, or the like, indicated at 15, one terminal of the battery being connected through wire 16 with a wire 10 and the other terminal being connected through wire 17 with the frame A. The housing 2 is grounded with relation to the frame and so is the rod 3, so that a circuit may be closed therethrough as will hereinafter be described.

In order that longitudinal sliding movement may be imparted to the rod 3 a sleeve 18 is secured to one end thereof. A rod 19 telescopes with relation to the sleeve and carries a pin 20 which extends through slots 21 formed in opposite sides of the sleeve, the slots 21 being of a predetermined length to permit a predetermined amount of movement between the rod 19 and the sleeve 18 before any movement is imparted to the rod 3. The connection shown between the sleeve 18 and the rod 19 will hereinafter be referred to as a lost motion device. Rod 19 is connected with a link 22 and this is, in turn, connected with a bracket 23 which is secured to the steering arm C, the link 22 being preferably adjustable to permit proper adjustment between the contacts 4b, 5b and the contact blocks 4 and 5.

The housing 2, together with the rod 3 and the contacts actuated thereby, is in reality nothing but a control switch or actuator as it controls the circuits through the signal lights 9 and 11. The control switch or actuator is controlled from the steering mechanism as it is connected to the steering arm C. Hence, if the steering wheel, not shown, is turned in one direction motion will be transmitted through shaft D and the worm gears contained in the housing to swing the steering arm C in the direction of arrow $a$, and if the steering wheel is rotated in the opposite direction the steering arm will swing in the direction of arrow $b$. This motion will obviously be transmitted through the link 22 to the rod 3 and a circuit will be closed through one or the other of the signal lights 9 and 11. If the driver desires to operate the signal for making a right hand turn, before arriving at the intersection or turn, the steering wheel is turned to the right causing the steering arm C to move in the direction of arrow $b$. During this movement link 22 will pull the rod 19 in the same direction and when pin 20 reaches the end of the slots 21, rod 3 will be pulled in the same direction and contact block 4 will ride into engagement with the contact arm 4b, thereby closing the circuit through the right hand signal lamp indicated at 9, which can be traced as follows: Current from the battery passes through wires 16 and 10, then through lamp 9 and wire 8 to terminal 6a, then passes through the contact arm 4b, contact block 4, rod 3, and the housing 2, and as the housing is grounded the current will pass through the frame A and wire 17 back to the battery, thereby completing the circuit.

The signal light may be displayed fifty (50) feet or more before reaching the intersection and it will remain illuminated until after the turn has been completed. Then, by merely turning the steering wheel slightly to the left, a reverse movement is transmitted to the rod 3 and contact block 4 will slide from under the contact arm 4b, causing it to ride up on the insulating block 4a thereby breaking the circuit. The same operation is resorted to when making a left hand turn, the only difference being that the steering wheel is turned to the left.

The lost motion device described is an important feature as it permits normal steering of the vehicle without closing a circuit through either of the signal lights. That is, the lost motion provided permits limited turning of the steering wheel to the right or the left without transmitting motion to the rod 3, hence preventing closing of the circuits described. On the other hand, when it is desired to display either signal the wheel is given a turn either to the right or to the left just a sufficient distance to impart movement to the rod 3 in the desired direction, then by returning the wheel to normal position the vehicle can continue on its straight course until the intersection is reached when the turn will be made. The vehicle light may thus be displayed fifty (50) feet or more before reaching the turn. It will remain displayed after the circuit has been closed and while making the turn and it will automatically be extinguished after the turn has been made by a slight movement of the steering wheel in the opposite direction.

The mechanism required is exceedingly simple and compact in construction requiring comparatively little space. It can be attached to the main frame, or at any point accessible to the steering arm, or in fact any movable part of the steering mechanism. It may be placed where it is concealed and at the same time easily accessible and as such will in no way detract from the appearance of the vehicle. It does not add any cumbersome mechanism either to the steering wheel or the instrument board, and it in no way interferes with the operation of the steering mechanism and as an adjustable connection is formed between the steering arm and the rod 3 it may be fitted and attached to practically any make of motor vehicle.

By employing a signaling mechanism of this character practically all former known devices may be eliminated, such as all manner of hand operated switches, push buttons, hand levers, foot switches, foot levers, or any other manually operated devices. Hand or arm signaling may be entirely eliminated and as the present device is controlled by the steering mechanism entirely the signal is automatically given when making a turn even though the driver should forget to close a circuit through the signal light prior to making the turn. The signal light would, of course, appear a little late under such circumstances but as the old saying goes "Better late than never".

The switch 14 is only used when parking the automobile or placing it in a garage. In other words when the signal mechanism is not in operation and is merely provided to prevent draining of the battery or burning out of the signal lamp; for instance in entering the garage the front wheels might be slightly turned or at least sufficient to throw one or the other of the signal lights in circuit, thus by having a hand operated switch in the main circuit the current may be thrown on and off as desired.

While signal lamps 9 and 11 have been illustrated, we wish it understood that electrically actuated semaphore arms, or any other signaling mechanism may be employed. For instance, a semaphore arm might be electrically actuated and, in that case, the control switch would operate the same as previously described, only in place of closing a circuit to illuminate a signal lamp it would close a circuit to actuate the semaphore arm, or the like, to automatically give the signal before and when making a turn whether lights or other devices are employed.

Having thus described our invention, what we claim and desire to secure by Letters Patent is:—

1. A switch for actuating direction indicating signals on a motor vehicle comprising a housing, a pair of terminal contacts in the housing, a switch arm for making or breaking a circuit through either contact, and means actuated by the steering mechanism of the vehicle for imparting movement to the switch arm, said means having a predetermined amount of lost motion so that the steering mechanism when positioned for straight travel can be turned a sufficient distance to transmit movement to the switch arm to close a circuit and then be returned to the straight travel position without breaking the circuit.

2. A switch for actuating direction indicating signals on a motor vehicle comprising a housing, a pair of terminal contacts in the housing, a rod reciprocally mounted in the housing, a pair of contact members carried by the rod and alternately engageable with the terminal contacts to close a circuit through one or another of said contacts, and means actuated by the steering mechanism of the vehicle for imparting movement to the rod, said means having a predetermined amount of lost motion so that the steering mechanism when positioned for straight travel can be turned a sufficient distance to transmit movement to the rod to close the circuit and then be returned to the straight travel position without breaking the circuit.

3. A switch for actuating direction indicating signals on a motor vehicle comprising a housing, a pair of terminal contacts in the housing, a rod reciprocally mounted in the housing, a pair of contact members carried by the rod and alternately engageable with the terminal contacts to close a circuit through one or another of said contacts, a link actuated by the steering mechanism of the vehicle for imparting longitudinal movement to the rod in one direction or the other, and a lost motion connection in said link so that the steering mechanism when positioned for straight travel can be turned a sufficient distance to transmit movement to the rod to close the circuit and then be returned to the straight travel position without breaking the circuit.

CURTIS W. BENKMAN.
FRANK C. RODRIGUES.
HUGH F. OPPERMAN.